US007280662B2

United States Patent
Walker et al.

(10) Patent No.: US 7,280,662 B2
(45) Date of Patent: Oct. 9, 2007

(54) TIME-SHIFTING DATA IN DIGITAL RADIO SYSTEM

(75) Inventors: Glenn A. Walker, Greentown, IN (US); Jerral A. Long, Kokomo, IN (US); William E. Dyson, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 757 days.

(21) Appl. No.: 10/700,208

(22) Filed: Nov. 3, 2003

(65) Prior Publication Data

US 2005/0094815 A1    May 5, 2005

(51) Int. Cl.
*H04K 1/00* (2006.01)
*H04N 1/44* (2006.01)
*H04N 7/10* (2006.01)
*H04N 7/173* (2006.01)
*G06F 11/30* (2006.01)
*G06F 12/14* (2006.01)
*H04L 9/32* (2006.01)

(52) U.S. Cl. .................. 380/255; 380/244; 725/36; 725/91; 725/92; 725/93; 713/193; 713/194

(58) Field of Classification Search ............. None
See application file for complete search history.

(56) References Cited

U.S. PATENT DOCUMENTS 5,892,535 A *  4/1999  Allen et al. .................. 725/36
2004/0089141 A1*  5/2004  Georges et al. ............... 84/609

* cited by examiner

*Primary Examiner*—Ayaz Sheikh
*Assistant Examiner*—Longbit Chai
(74) *Attorney, Agent, or Firm*—Jimmy L. Funke

(57) ABSTRACT

A satellite-based digital audio radio (SDAR) receiver is configured to temporarily store data that may be transmitted to the SDAR receiver at a time inconvenient to the subscriber. A memory arrangement buffers data output by a channel decoder. The SDAR receiver can use the buffered data prior to using any currently transmitted data. The buffered data is associated with buffered timing information that lags behind the current timing information associated with the currently transmitted data. The buffered data is available for use only once before a decryption subsystem receives the current timing information. If the subscriber uses the currently transmitted data, the decryption subsystem receives the current timing information. The decryption subsystem decrypts only data that is associated with timing information that is no earlier than the latest timing information received by the decryption subsystem. Accordingly, the buffered data becomes unavailable once the decryption subsystem receives the current timing information.

24 Claims, 3 Drawing Sheets

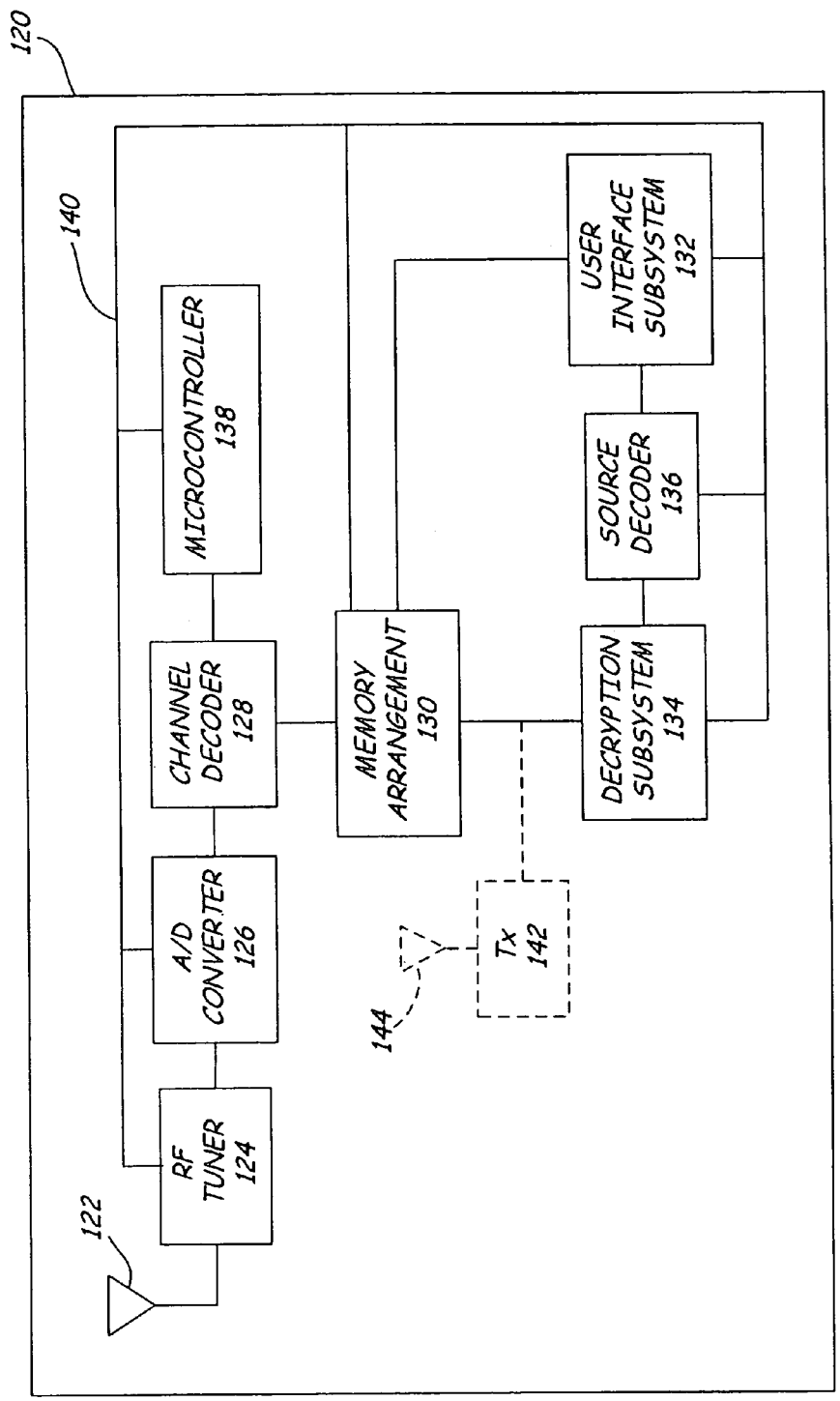

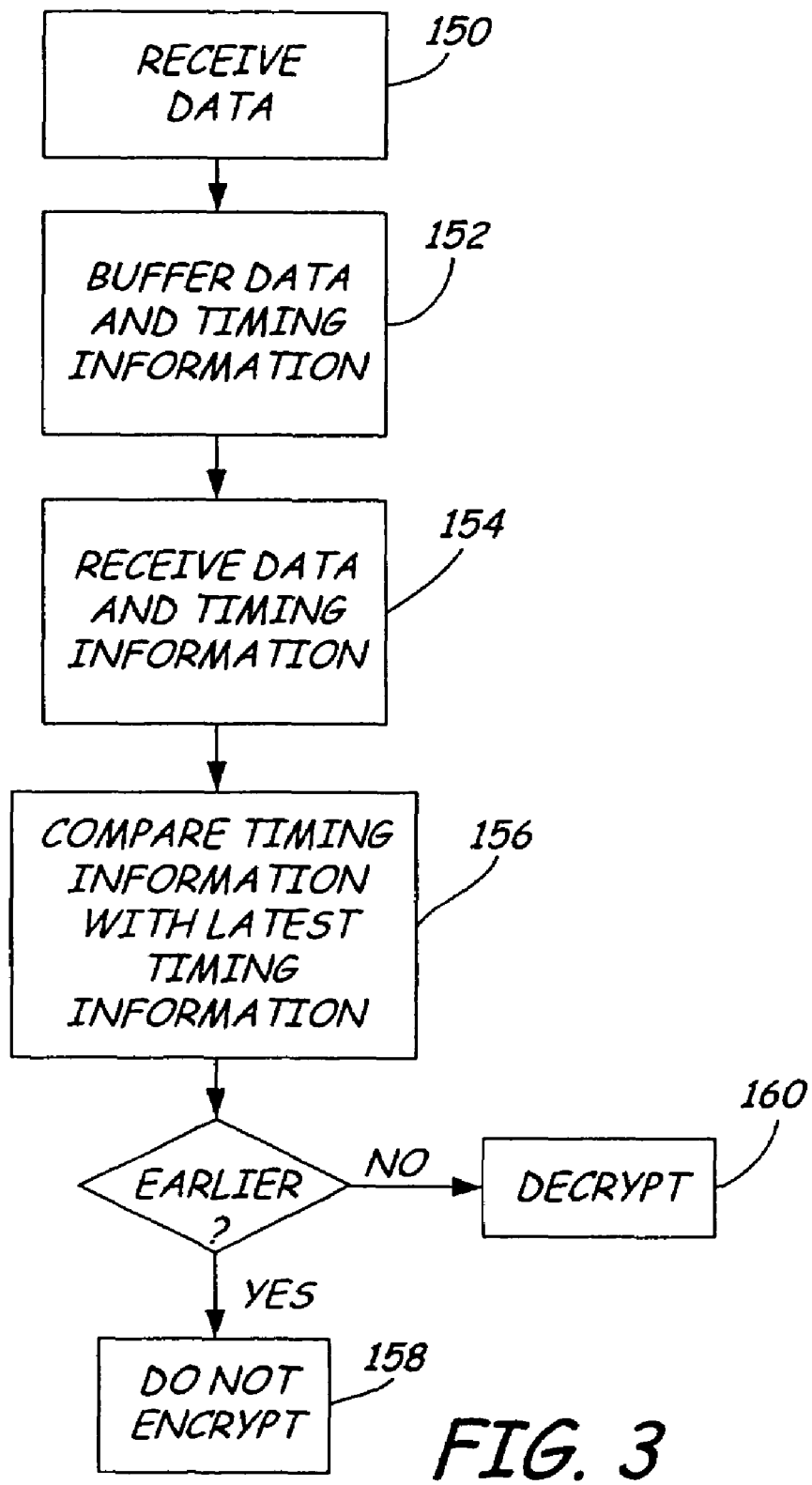

TIME-SHIFTING DATA IN DIGITAL RADIO SYSTEM

TECHNICAL BACKGROUND

The present invention relates generally to communication services. More particularly, the present invention relates to digital radio services.

BACKGROUND OF THE INVENTION

The vast majority of vehicles currently in use incorporate vehicle communication systems for receiving or transmitting signals. For example, vehicle audio systems provide information and entertainment to many motorists daily. These audio systems typically include an AM/FM radio receiver that receives radio frequency (RF) signals. These RF signals are then processed and rendered as audio output.

Some vehicle audio systems are configured to take advantage of satellite-based digital audio radio (SDAR) services that offer digital radio service covering a large geographic area, such as North America. By contrast, AM and FM broadcast radio signals can reach a relatively limited geographic area, such as a metropolitan area. SDAR service providers typically transmit digital radio service via either geosynchronous orbit satellites or highly elliptical orbit satellites that receive uplinked programming. These satellites broadcast the programming directly to digital radios that subscribe to the service. Subscribing digital radios are typically located in vehicles, but can also be located in homes and other fixed locations. In addition, some subscribing digital radios are portable units that can be used by subscribers during such activities as exercising. SBAR systems typically employ terrestrial, or ground-based, repeaters in addition to satellite-based transmitters to provide a clean and uninterrupted radio signal broadcast in certain areas susceptible to satellite signal blockage. Each vehicle subscribing to the digital service generally includes a digital radio having a receiver and a pair of antennas for receiving the satellite and terrestrial signal broadcasts.

SDAR service providers offer a variety of audio programming, including programs that are broadcast at set times according to a schedule. Some subscribers may find these programs appealing, but might be unable to listen to them at the scheduled broadcast times for any of a variety of reasons. For example, some subscribers may work in an environment that does not allow the use of radios or that lacks access to SDAR services. Such subscribers may want to record the programs as they are broadcast and listen to them at a more convenient time. While this feature is desirable from the perspective of the subscriber, some subscribers may use this feature to replay recorded programs multiple times and potentially even distribute recorded programs to other parties, including persons who do not subscribe to SDAR services. SDAR service and content providers, as well as the recording and music industries, would be potentially deprived of advertising, royalty, and other revenues as a result of such use of a recording feature. Accordingly, the ability to record audio programming and play the recording back multiple times may be objectionable to SDAR service and content providers and the recording and music industries.

SUMMARY OF THE INVENTION

According to various example embodiments of the present invention, a satellite-based digital audio radio (SDAR) receiver is configured to temporarily store data that may be transmitted to the SDAR receiver at a time inconvenient to the subscriber. More particularly, a memory arrangement buffers data output by a channel decoder before the data is decrypted by a decryption subsystem. With the data thus buffered, the SDAR receiver can use the buffered data prior to using any currently transmitted data. The buffered data is associated with buffered timing information that lags behind the current timing information associated with the currently transmitted data. The buffered data is available for use only once before the decryption subsystem receives the current timing information. If the subscriber decides to change the channel and use the currently transmitted data, the decryption subsystem receives the current timing information, which is ahead of the buffered timing information. The decryption subsystem decrypts only data that is associated with timing information that is no earlier than the latest timing information received by the decryption subsystem. Accordingly, the buffered data, which is associated with earlier timing information, becomes unavailable for use once the decryption subsystem receives the current timing information associated with the currently transmitted data.

One embodiment of the invention is directed to a method to time-shift data in a communication device. The data, along with timing information, are buffered using a memory arrangement. A decryption subsystem receives either the buffered timing information or current timing information associated with currently transmitted data. The decryption subsystem decrypts the buffered data only when the buffered timing information is not earlier than the timing information received by the decryption subsystem. This method may be embodied in processor-readable media.

In another embodiment, a communication device operable in a satellite-based digital audio radio (SDAR) system includes an antenna configured to receive a signal from an SDAR service provider. A channel decoder is operatively coupled to the antenna and generates data and timing information as a function of the received signal. A memory arrangement is operatively coupled to the channel decoder and buffers the data and timing information. A decryption subsystem operatively coupled to the memory arrangement and the channel decoder receives either the buffered timing information or current timing information that is associated with currently transmitted data in a decryption subsystem. The decryption subsystem decrypts the buffered data only when the buffered timing information is not earlier than the timing information received by the decryption subsystem.

Various embodiments of the present invention may provide certain advantages. For instance, various embodiments may facilitate time-shifting of audio and other data in a communication device, such as a satellite-based digital audio radio (SDAR) receiver. Time-shifting refers to the ability to use the data once at some time after the data has been received by the SDAR receiver. Time-shifting is contrasted with archiving, in which the data can be used multiple times. Archiving raises copyright concerns due to the potential for revenue loss, it is generally agreed that time-shifting is an unobjectionable use of program data. Accordingly, time-shifting allows subscribers to listen to or otherwise use data at a convenient time, while protecting the copyright interests of SDAR service and content providers and the recording and music industries.

Additional objects, advantages, and features of the present invention will become apparent from the following description and the claims that follow, considered in conjunction with the accompanying drawings.

BRIEF DESCRIPTION OF THE DRAWINGS

The present invention will now be described, by way of example, with reference to the accompanying drawings, in which:

FIG. 2 is a block diagram illustrating an example SDAR receiver according to another embodiment of the invention; and FIG. 3 is a flow diagram illustrating an example method for time-shifting data in an SDAR system, according to still another embodiment of the invention.

DESCRIPTION OF PREFERRED EMBODIMENTS

Figure 1:
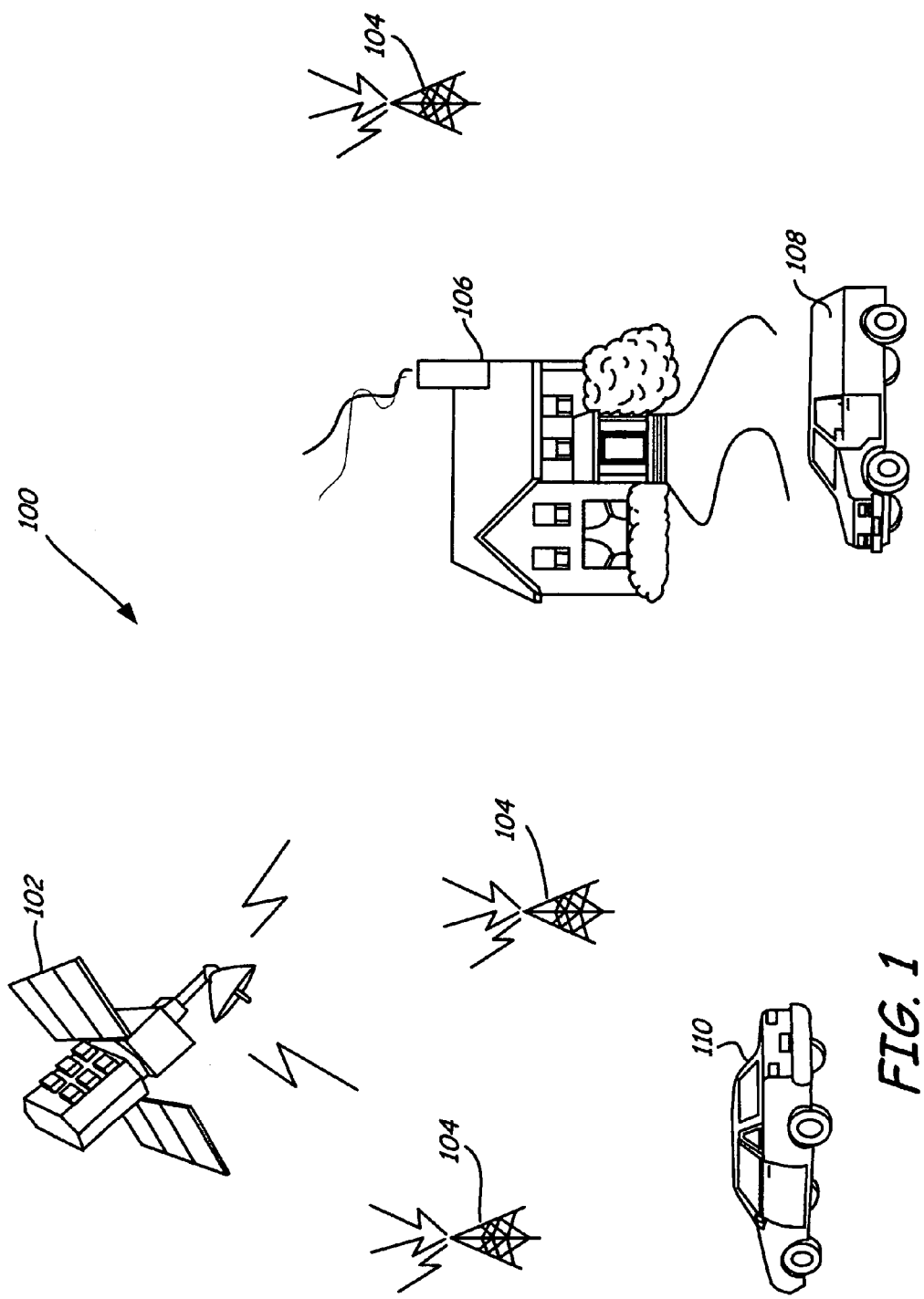
FIG. 1 illustrates an example satellite-based digital audio radio (SDAR) system, according to an embodiment of the invention.

Various embodiments of the present invention facilitate time-shifting of audio and other data in a communication device, such as a satellite-based digital audio radio (SDAR) receiver. Time-shifting refers to the ability to use the data once at some time after the data has been received by the SDAR receiver. Time-shifting is contrasted with archiving, in which the data can be used multiple times. Archiving raises copyright concerns due to the potential for revenue loss, it is generally agreed that time-shifting is an unobjectionable use of program data.

The following description of various embodiments implemented in a vehicle-based SDAR device is to be construed by way of illustration rather than limitation. This description is not intended to limit the invention or its applications or uses. For example, while various embodiments of the invention are described as being implemented in vehicle-based SDAR device, it will be appreciated that the principles of the invention are applicable to SDAR devices operable in other environments.

In the following description, numerous specific details are set forth in order to provide a thorough understanding of various embodiments of the present invention. It will be apparent to one skilled in the art that the present invention may be practiced without some or all of these specific details. In other instances, well known components and process steps have not been described in detail in order to avoid unnecessarily obscuring the present invention.

The invention may be described in the general context of processor-executable instructions, such as program modules, being executed by a processor. Generally, program modules include routines, programs, objects, components, data structures, etc., that perform particular tasks or implement particular abstract data types. The invention may also be practiced in distributed processing environments in which tasks are performed by remote processing devices that are linked through a communications network or other data transmission medium. In a distributed processing environment, program modules and other data may be located in both local and remote storage media, including memory storage devices.

Referring now to the drawings, FIG. 1 illustrates an example SDAR system 100 in which a satellite 102 in geosynchronous or highly elliptical orbit around the Earth broadcasts radio frequency (RF) signals via one or more satellite-based transmitters. One or more ground-based, or terrestrial, repeaters 104 may rebroadcast the RF signals received from the satellite 102 to reach areas not covered by the satellite 102 itself, e.g., tunnels and other enclosed areas.

A SDAR subscriber uses a SDAR receiver to access SDAR services. The SDAR receiver may be located, for example, in a house 106 or in a vehicle 108. Some SDAR subscribers have multiple receivers. For example, in addition to receivers located in the house 106 and in the vehicle 108, the subscriber may have another receiver located in another vehicle 110.

The SDAR receiver is configured to temporarily store data that the satellite 102 or repeaters 104 may transmit to the SDAR receiver at a time inconvenient to the subscriber. As described below in connection with FIG. 2, the SDAR receiver buffers decoded channel data before the decoded channel data is decrypted. The buffered data is associated with timing information, which is also buffered. The buffered timing information lags behind current timing information that is associated with data currently transmitted by the satellite 102 or repeaters 104. Both the buffered timing information and the current timing information may include, for example, the time at which the data was transmitted by the satellite 102 or the repeaters 104, the time at which the data was received in the SDAR receiver, or some other timestamp that indicates a relative timing differential between the buffered data and the current data.

The SDAR receiver is configured to permit use of buffered data only once before the SDAR receiver uses the currently transmitted data. Once the SDAR receiver uses the currently transmitted data, a decryption subsystem incorporated in the SDAR receiver receives the current timing information. The decryption subsystem decrypts only data that is associated with timing information that is no earlier than the latest timing information received by the decryption subsystem. When the SDAR receiver is using buffered data, the latest timing information is the buffered timing information. On the other hand, when the SDAR receiver uses currently transmitted data, the latest timing information is the current timing information. Accordingly, the buffered data, which is associated with earlier timing information, becomes unavailable for use once the decryption subsystem receives the current timing information associated with the currently transmitted data.

If the SDAR subscriber owns multiple SDAR receivers, the SDAR service provider may allow the SDAR subscriber to transmit the buffered data between the multiple SDAR receivers using, for example, a wireless transmitter. The buffered data may be transmitted using any of a variety of wireless communication protocols, including but not limited to the Bluetooth, ZigBee, ultra wideband (UWB), and IEEE 802.11b communication protocols.

FIG. 2 is a block diagram illustrating an example SDAR receiver 120 according to another embodiment of the invention. The SDAR receiver 120 is associated with a satellite antenna 122 for receiving RF signals broadcast by the satellite 102. In addition, the SDAR receiver 120 may also be associated with a terrestrial antenna (not shown) for receiving RF signals broadcast by the terrestrial repeaters 104. At any given time, either the satellite antenna 122 or the terrestrial antenna provides a primary signal path, and the other antenna provides a secondary signal path. While not shown in FIG. 2, the SDAR receiver 120 may also have additional antennas that provide additional signal paths.

The SDAR receiver 120 is configured to receive, decrypt, and decode digital data signals received via the satellite antenna 122 and the terrestrial antenna. An RF tuner 124 has antenna inputs for receiving RF signals received by each of the satellite antenna 122 and the terrestrial antenna. The RF tuner 124 selects a frequency bandwidth or channel of digital audio and/or data to pass each of the RF signals within a tuned frequency bandwidth. An analog-to-digital converter 126 receives the analog signals output by the RF tuner 124 and converts them to digital signals. In addition, a signal quality monitor (not shown) may monitor the signal quality of each channel. The signal quality monitor may monitor, for example, the bit error rate (BER) and/or the signal-to-noise ratio (S/N) of the digital signals. The SDAR receiver 120 also includes a channel decoder 128 that processes a time division multiplexed (TDM) data stream.

A memory arrangement 130 receives the TDM data stream, which may include audio information, control and other data, or both. The TDM data stream also includes timing information. The memory arrangement 130 includes a buffer memory configured to buffer the TDM data stream, including the timing information. To conserve buffer memory space, the memory arrangement 130 preferably buffers only a single channel of data. The buffer memory may be configured as a circular buffer for simultaneously buffering and outputting data. The memory arrangement 130 also incorporates a bypass arrangement that allows currently transmitted data, including current timing information, to pass through the memory arrangement 130. Accordingly, the memory arrangement 130 outputs either the buffered data or the currently transmitted data, as selected by the subscriber using a user interface subsystem 132. In either case, the data output by the memory arrangement 130 includes timing information.

The memory arrangement 130 may incorporate or be configured for use with a removable memory device, such as a flash memory device. In such a configuration, the memory arrangement 130 uses the removable memory device to buffer the TDM data stream. In this way, the SDAR receiver 120 can buffer data for one-time use in another SDAR receiver. For example, a home-based SDAR receiver can buffer data for one-time use in a vehicle-based or portable SDAR receiver.

A decryption subsystem 134 receives the data output by the memory arrangement 130. This data includes timing information. If the memory arrangement 130 outputs the buffered data, the timing information is buffered timing information that lags behind the current timing information. If the memory arrangement outputs the currently transmitted data, the timing information is the current timing information.

The decryption subsystem 134 is configured to decrypt only data that is associated with timing information that is no earlier than the latest timing information received by the decryption subsystem 134. If the decryption subsystem 134 receives the buffered data, including the buffered timing information, the decryption subsystem 134 will decrypt the buffered data because the associated timing information is not earlier than the latest timing information, i.e., the buffered timing information, received by the decryption subsystem 134.

If the subscriber decides to use the currently transmitted data and, as a result, uses the user interface subsystem 132 to cause the memory arrangement 130 to output the currently transmitted data, including the current timing information, the decryption subsystem 134 decrypts the currently transmitted data. The currently transmitted data is associated with timing information that is no earlier than the latest timing information, i.e., the current timing information, received by the decryption subsystem 134.

At this point, the latest timing information received by the decryption subsystem 134 is the current timing information, not the buffered timing information, which lags the current timing information. Accordingly, if the subscriber subsequently tries to use the buffered data, the decryption subsystem 134 will not decrypt the buffered data. The buffered data is associated with timing information, i.e., the buffered timing information, that is earlier than the latest timing information received by the decryption subsystem 134, i.e., the current timing information. As a result, the buffered data becomes unavailable for use when the subscriber switches from using the buffered data to using the currently transmitted data.

The decryption subsystem 134 outputs decrypted data to a source decoder 136, which selects and decodes desired information contained within the TDM data stream. This information may include audio information, control and other data, or both. The source decoder 136 outputs the decoded information to the user interface subsystem 132. The decoded information may also be passed to a digital-to-analog converter (DAC) (not shown) that generates an analog audio output signal.

Buffering the encrypted data output by the channel decoder 128 prevents circumvention of the time-shifting techniques disclosed herein to allow, for example, archiving of SDAR content. By contrast, buffering the decoded data output by the source decoder 136 might undesirably facilitate circumvention of these time-shifting techniques.

The SDAR receiver 120 also includes a microcontroller 138 for communicating with and controlling the RF tuner 124, the analog-to-digital converter 126, the channel decoder 128, the memory arrangement 130, the user interface subsystem 132, the decryption subsystem 134, and the source decoder 136 via a data communication bus 140 or other communication path. The microcontroller 138 is typically configured to operate with one or more types of processor readable media. Processor readable media can be any available media that can be accessed by the microcontroller 138 and includes both volatile and nonvolatile media, removable and non-removable media. By way of example, and not limitation, processor readable media may include storage media and communication media. Storage media includes both volatile and nonvolatile, removable and non-removable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the microcontroller 138. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

In some implementations, a data transmission subsystem 142 transmits the buffered data to another communication device, such as another SDAR receiver. The data transmission subsystem 142 may include a wireless transmission arrangement incorporating an antenna 144 to transmit the buffered data to the other communication device via a wireless communication link. This wireless communication link can be established using any of a variety of conventional wireless communication protocols, including, but not limited to, the Bluetooth, ZigBee, ultra wideband (UWB), and IEEE 802.11b communication protocols. In such implementations, the communication device to which the buffered data is transmitted preferably incorporates a decryption subsystem that also implements safeguards against multiple use of the buffered data.

FIG. 3 is a flow diagram illustrating an example method for time-shifting data in an SDAR system, according to still another embodiment of the invention. As described above in connection with FIG. 2, the SDAR receiver 120 receives data transmitted by the SDAR service provider (150). The memory arrangement 130 then buffers the received data, including the associated timing information (152). The decryption subsystem 134 receives either the buffered data or the currently transmitted data (154). The subscriber controls the selection of which data is received by the decryption subsystem 134 via the user interface subsystem 132.

As part of the data stream output by the memory arrangement 130, the decryption subsystem 134 also receives timing information. If the decryption subsystem 134 receives the currently transmitted data, the timing information received is the current timing information. If, on the other hand, the decryption subsystem receives the buffered data, the timing information received is the buffered timing information, which lags behind the current timing information.

The decryption subsystem 134 compares the received timing information with the latest timing information it has received (156). The latest timing information is defined as the timing information representing the latest point in time, as potentially distinguished from the most recently received timing information. The most recently received timing information may not represent the latest point in time, and would not, in that scenario, be the latest timing information.

If the received timing information is earlier than the latest timing information, i.e., if the received timing information represents a point earlier in time than the latest timing information, the decryption subsystem 134 does not decrypt the received data (158). If the received timing information does not represent a point earlier in time than the latest timing information, the decryption subsystem 134 decrypts the received data (160). In this way, the buffered data is made unavailable for use when the decryption subsystem receives currently transmitted data. The buffered data can only be used when the decryption subsystem has not received currently transmitted data that is more recent than the buffered data.

As an illustrative example, a subscriber may program the SDAR receiver 120 at 8:00 am to buffer a particular channel from 2:00 pm to 3:00 pm. The subscriber then turns off the SDAR receiver 120 and returns and turns it back on at 5:00 pm. While the subscriber was absent, the SDAR receiver 120 turns itself on at 2:00 pm and buffers the data on the selected channel until 3:00 pm, at which time the SDAR receiver 120 turns itself back off. When the subscriber turns the SDAR receiver 120 on at 5:00 pm, the user interface subsystem 132 presents the subscriber with the option of using either the buffered data or the currently transmitted data. If the subscriber selects the buffered data, the decryption subsystem 134 will receive timing information starting at 2:00 pm and decrypt the buffered data. Once the buffered data has been decrypted and used, the decryption subsystem 134 switches to using the currently transmitted data, which is associated with timing information no earlier than 5:00 pm. If the subscriber initially selects the currently transmitted data, the decryption subsystem 134 also receives timing information starting no earlier than 5:00 pm. If the subscriber subsequently attempts to select the buffered data, the decryption subsystem 134 will not decrypt the buffered data because its associated timing information starting at 2:00 pm represents a point earlier in time than 5:00 pm. Thus, the buffered data is unavailable for use once it has been played. The buffered data is also unavailable for use if the subscriber initially selects the currently transmitted data. While not required, the SDAR receiver 120 preferably deletes the unusable buffered data.

If, in the above example, the subscriber returns and turns the SDAR receiver back on at 2:30 pm rather than at 5:00 pm, the subscriber may use the buffered data starting at 2:00 pm. The memory arrangement 130 is then configured as a circular buffer that buffers the currently received data as it outputs the buffered data. The circular buffer continuously buffers the currently received data and outputs the buffered data until the subscriber decides to change channels. If the subscriber changes channels, the timing information received by the decryption subsystem 134 begins at the point in time at which the subscriber changed channels. Accordingly, the buffered data becomes unavailable for use.

In either scenario described above, the subscriber can skip forward through the buffered data using the user interface subsystem 132. Because the decryption subsystem 134 receives timing information contemporaneously with the buffered data, however, the subscriber is not able to return to an earlier point in time in the buffered data. That is, the subscriber can "fast forward" through the buffered data, but cannot "rewind" through the buffered data.

As demonstrated by the foregoing discussion, various embodiments of the present invention may provide certain advantages. By time-shifting data, an SDAR receiver allows an SDAR subscriber to listen to or otherwise use audio and other SDAR programming at a convenient time. At the same time, because the time-shifted data can only be used once, the copyright interests of SDAR service and content providers and the recording and music industries are protected.

It will be understood by those who practice the invention and those skilled in the art that various modifications and improvements may be made to the invention without departing from the spirit and scope of the disclosed embodiments. The scope of protection afforded is to be determined solely by the claims and by the breadth of interpretation allowed by law.

What is claimed is:

1. A method to time-shift data in a communication device, the method comprising:
    buffering the data and timing information using a memory arrangement;
    receiving one of the buffered timing information and current timing information associated with currently transmitted data in a decryption subsystem; and
    using the decryption subsystem to decrypt the buffered data only when the buffered timing information is not earlier than a latest timing information associated with currently known data received by the decryption subsystem, wherein the buffered data becomes unavailable once the decryption subsystem receives the current timing information.

2. The method of claim 1, further comprising buffering the data and timing information using a removable memory device.

3. The method of claim 2, wherein the removable memory device comprises a flash memory device.

4. The method of claim 1, further comprising transmitting the buffered data to another communication device.

5. The method of claim 4, further comprising transmitting the buffered data to another communication device using a wireless communication protocol.

6. The method of claim 5, wherein the wireless communication protocol is selected from the group consisting of the Bluetooth, ZigBee, ultra wideband (UWB), and IEEE 802.11b communication protocols.

7. The method of claim 1, wherein the communication device comprises a satellite-based digital audio radio (SDAR) receiver.

8. The method of claim 7, wherein the data comprises audio data.

9. A controller configured to operate with a processor-readable medium having processor-executable instructions for:
   buffering data and timing information received by a communication device using a memory arrangement;
   receiving one of the buffered timing information and current timing information associated with currently transmitted data in a decryption subsystem; and
   using the decryption subsystem to decrypt the buffered data only when the buffered timing information is not earlier than a latest timing information associated with currently known data received by the decryption subsystem, wherein the buffered data becomes unavailable once the decryption subsystem receives the current timing information.

10. The controller of claim 9, wherein the data and timing information is buffered using a removable memory device.

11. The controller of claim 10, wherein the removable memory device comprises a flash memory device.

12. The controller of claim 9, further having processor-executable instructions for transmitting the buffered data to another communication device.

13. The controller claim 12, further having processor-executable instructions for transmitting the buffered data to another communication device using a wireless communication protocol.

14. The controller of claim 13, wherein the wireless communication protocol is selected from the group consisting of the Bluetooth, ZigBee, ultra wideband (UWB), and IEEE 802.11b communication protocols.

15. The controller of claim 9, wherein the communication device comprises a satellite-based digital audio radio (SDAR) receiver.

16. The controller of claim 15, wherein the data comprises audio data.

17. A communication device operable in a satellite-based digital audio radio (SDAR) system, the communication device comprising:
   an antenna configured to receive a signal from an SDAR service provider;
   a channel decoder operatively coupled to the antenna and configured to generate data and timing information as a function of the received signal;
   a memory arrangement operatively coupled to the channel decoder and configured to buffer the data and timing information;
   a decryption subsystem operatively coupled to the memory arrangement and the channel decoder and configured to
      receive one of the buffered timing information and current timing information associated with currently transmitted data in a decryption subsystem, and
      decrypt the buffered data only when the buffered timing information is not earlier than a latest timing information associated with currently known data received by the decryption subsystem, wherein the buffered data becomes unavailable once the decryption subsystem receives the current timing information.

18. The communication device of claim 17, wherein the memory arrangement comprises a removable memory device configured to buffer the data and timing information.

19. The communication device of claim 18, wherein the removable memory device comprises a flash memory device.

20. The communication device of claim 17, further comprising a data transmission subsystem configured to transmit the buffered data to another communication device.

21. The communication device of claim 20, wherein the data transmission subsystem comprises a wireless transmission arrangement configured to transmit the buffered data to another communication device using a wireless communication protocol.

22. The communication device of claim 21, wherein the wireless communication protocol is selected from the group consisting of the Bluctootli, ZigBcc, ultra wideband (UWB), and IEEE 802.11b communication protocols.

23. The communication device of claim 17, wherein the communication device comprises a satellite-based digital audio radio (SDAR) receiver.

24. The communication device of claim 23, wherein the data comprises audio data.

* * * * *